US009560010B1

(12) United States Patent
Estes et al.

(10) Patent No.: US 9,560,010 B1
(45) Date of Patent: Jan. 31, 2017

(54) NETWORK FILE TRANSFER

(71) Applicant: Amazon Technologies, Inc., Seattle, WA (US)

(72) Inventors: Matthew Allen Estes, Herndon, VA (US); David Eugene Walter Koenig, Falls Church, VA (US); Robert Eric Fitzgerald, Herndon (VA); Brent William Farrell, Reston, VA (US)

(73) Assignee: Amazon Technologies, Inc., Seattle, WA (US)

( * ) Notice: Subject to any disclaimer, the term of this patent is extended or adjusted under 35 U.S.C. 154(b) by 130 days.

(21) Appl. No.: 14/673,573

(22) Filed: Mar. 30, 2015

(51) Int. Cl.
*H04L 29/06* (2006.01)
*G06F 21/60* (2013.01)

(52) U.S. Cl.
CPC .............. *H04L 63/02* (2013.01); *G06F 21/602* (2013.01); *H04L 63/1425* (2013.01)

(58) Field of Classification Search
USPC .................... 713/181, 176, 180; 726/4, 30
See application file for complete search history.

(56) References Cited

U.S. PATENT DOCUMENTS

| | | | | |
|---|---|---|---|---|
| 6,021,491 A * | 2/2000 | Renaud | .................. | G06F 21/64 713/179 |
| 7,146,421 B2 * | 12/2006 | Syvanne | .............. | H04L 63/0227 370/395.32 |
| 7,363,653 B2 * | 4/2008 | Deng | ...................... | H04L 29/06 726/1 |
| 7,613,193 B2 * | 11/2009 | Swami | .................. | H04W 12/12 370/349 |
| 7,624,434 B2 * | 11/2009 | Rigstad | ................... | H04L 63/20 709/225 |
| 8,281,383 B2 * | 10/2012 | Levy-Abegnoli | ....... | H04L 45/00 370/315 |
| 8,402,540 B2 * | 3/2013 | Kapoor | .................. | G06F 9/505 709/224 |
| 8,473,743 B2 * | 6/2013 | Freedman | ............... | H04L 63/02 709/223 |
| 2003/0191848 A1 * | 10/2003 | Hesselink | ........... | H04L 63/0209 709/229 |
| 2007/0192621 A1 * | 8/2007 | Li | ....................... | H04L 63/0227 713/189 |
| 2007/0282953 A1 * | 12/2007 | Jain | ...................... | G06Q 10/107 709/206 |

(Continued)

*Primary Examiner* — Amare F Tabor
(74) *Attorney, Agent, or Firm* — Thorpe North & Western LLP

(57) ABSTRACT

A technology is described for transferring a file from an unsecure network to a secure network. An example method may include identifying an unsecure account profile and determining that a file is to be transmitted from an unsecure network to a secure network using a one-way transfer device. In response, the file may be obtained from a file storage location and an unsecure account profile name for the unsecure account profile may be identified. A request may be made that the one-way transfer device to transmit the file and the unsecure account profile name to the secure network. The file and the unsecure account profile name may then be transmitted to the secure network, where a secure account profile corresponding to the unsecure account profile may be identified in the secure network and the file may be placed in a folder associated with the secure account profile.

20 Claims, 8 Drawing Sheets

(56) References Cited

U.S. PATENT DOCUMENTS

2009/0064326 A1* 3/2009 Goldstein ........... H04L 63/0227
  726/22
2010/0049985 A1* 2/2010 Levow ................. H04L 12/585
  713/180

* cited by examiner

NETWORK FILE TRANSFER

BACKGROUND

Unidirectional computer networks may be used by organizations to isolate a secure computer network from separate unsecure computer networks. For example, an organization may wish to isolate a secure network so that data cannot be transmitted outside of the secure network (e.g., via the Internet or another network), yet still provide a system to transfer data from an unsecure network to the secure network. A unidirectional computer network may include a one-way transfer device, which may be a network hardware appliance that transmits data in one direction using limited data formats.

In one example, a one-way transfer device may essentially have a low sending side (e.g., a low side server) connected to a high receiving side (e.g., high side server) by a one-way wire (e.g., a circuit diode or fiber optic cable). Data from a low side network (e.g., an unsecure network) may be transmitted to the one-way transfer device and the data may then be transmitted to a high side network (e.g., a secure network) via the one-way wire. A one-way transfer device may further include data inspection utilities that, for example, analyze data for allowable file types and/or perform data checking (e.g., virus scanning).

DETAILED DESCRIPTION

Figure 1A:
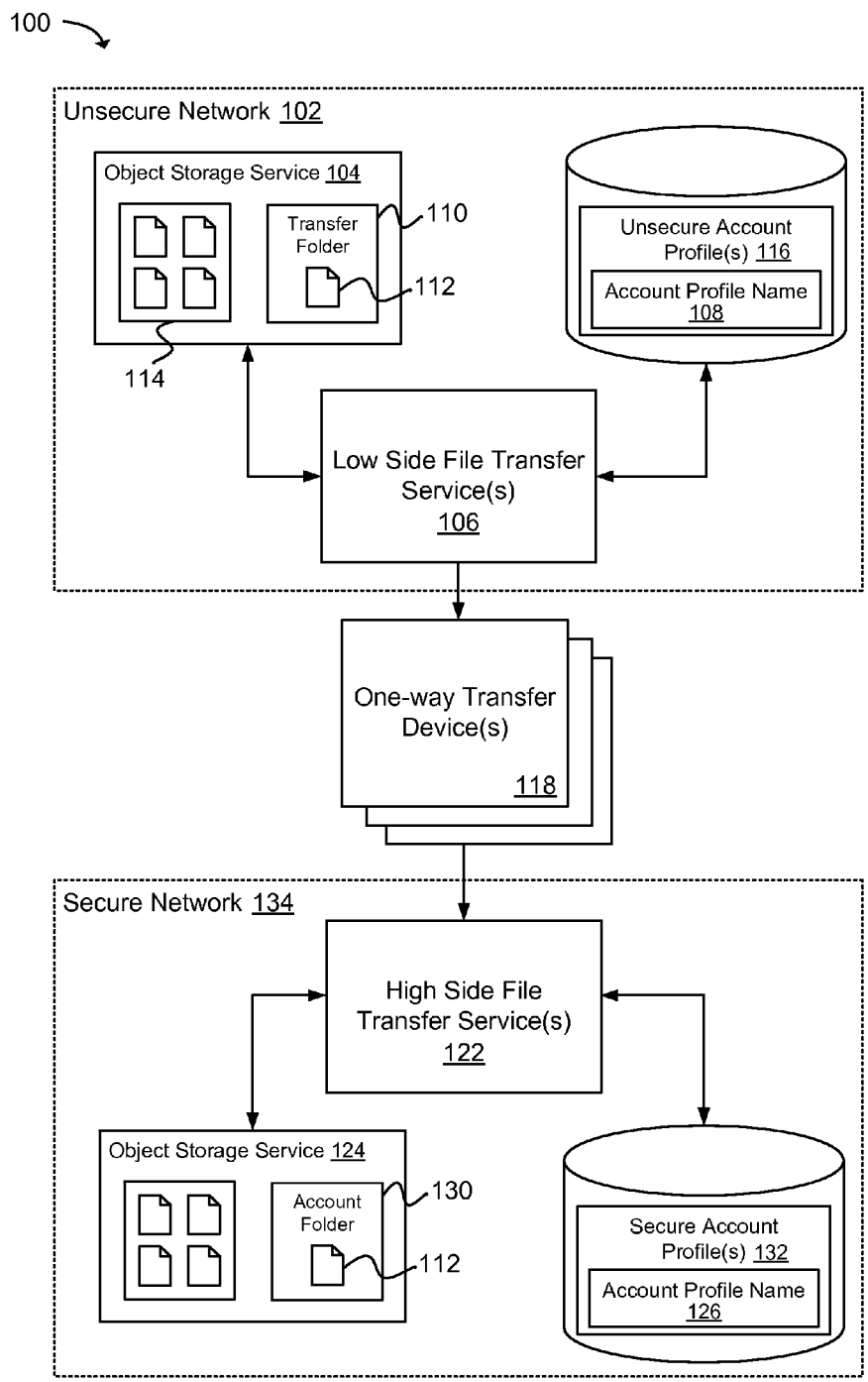
FIG. 1a is a block diagram illustrating an example system for transferring files from an unsecure network to a secure network using a one-way transfer device.

A technology is described for a scalable one-way data transfer system that utilizes an account profile located on an unsecure network and an account profile located on a secure network to link the transfer of a file from the unsecure network (e.g., a low side network) to the secure network (e.g., a high side network). The terms unsecure network and low side network, and the terms secure network and high side network are used interchangeably in this disclosure. In one example configuration, files stored in a data storage system located within an unsecure network may be transferred to a data storage system located within a secure network using one or more one-way transfer devices. A data storage system may include an data storage service, object storage service, a key-value data store (NoSQL, JSON file or XML file), a relational data store, as well as other types of data stores. An unsecure network may be, for example, a network that may be accessible to a public network, such as the Internet, whereas a secure network may be isolated from public networks. A file may be a digital file or digital object containing data and may be of any file type or file format. A one-way transfer device may be configured to unidirectionally transmit files from a first network to a second network, such that files cannot be transmitted in a reverse direction.

In one example, a low side file transfer service executing in an unsecure network may be configured to monitor a transfer folder associated with low side account profile for files that have been placed in the transfer folder. The transfer folder may be located in the data storage system on the unsecure network. In the event that the transfer folder contains a file, the low side file transfer service may be configured to retrieve the file from the file folder and place the file in a staging storage location accessible to the low side file transfer service.

A low side account profile may be identified that may be associated with a user of the unsecure network and the file and an account profile name may be retrieved from the low side account profile. The account profile name may correspond to an account profile name for a high side account profile. After the file has been transferred to the secure network, the account profile name may be used to identify the high side account profile and to associate the file with the high side account profile. The low side file transfer service may be configured to send a transfer request to a one-way transfer device, whereupon the one-way transfer device may initiate a transfer of the file from the staging location to the one-way transfer device. The file may then be transmitted to the secure network by the one-way transfer device, where a high side account profile corresponding to the low side account profile may be identified and the file may be placed in an account folder associated with the high side account profile.

Existing unidirectional computer networks may support basic protocols for transferring data and may not be scalable according to file transfer demand. The present technology extends the use of unidirectional computer networks to computing service environments (e.g., cloud networks) that may be logically or physically partitioned, allowing for data transfers from unsecure to secure cloud network partitions. Servers used to provide a file transfer service for a unidirectional computer network may be located in multiple geographic regions, thereby providing fault tolerance in the event that a server in a particular geographic region fails. In addition, the present technology allows for scaling of a unidirectional network by scaling the number of servers that execute a file transfer service and the number of one-way transfer devices included in the unidirectional network according to file transfer demand.

FIG. 1a is a diagram illustrating a high level example of a system 100 that may be used to transfer files 112 from an unsecure network 102 (e.g., low side network) to a secure network 134 (e.g., high side network) using a one-way transfer device 118. The unsecure network 102 and the secure network 134 may be computer networks that have been implemented as one or more computing service environments. The unsecure and secure networks 102, 134 may be physically partitioned from one another, thereby isolating data stored in the secure network 134 from the unsecure networks 102.

The unsecure network 102 may include a low side file transfer service 106 and a low side object storage service 104. The secure network 134 may include a high side file transfer service 106 and a high side object storage service 104. Corresponding account profiles may be established on the unsecure network 102 and the secure network 134. For instance, an unsecure account profile 116 may be set up on the unsecure network 102 and a corresponding secure account profile 132 may be set up on the secure network 134. Account profile names 108 and 126 may link the unsecure account profile 116 with the secure account profile 132, such that a file 112 associated with an unsecure account profile 116 transferred from the unsecure network 102 to the secure network 134 may be associated with a secure account profile 132 using the account profile names 108 and 126. As an illustration, an account profile name ("account1234") used to identify an unsecure account profile 116 may be the same as an account profile name ("account1234") used to identify a secure account profile 132. As a result, when a file 112 is received at the secure network 134, a secure account profile 132 may be identified for the file 112 using the account profile name ("account1234"). Illustratively, an account profile name 108, 126 used to link an unsecure account profile 116 with a secure account profile 132 may also be something other than plain text, such as a hash value, a private or public key, a randomly generated value shared between the unsecure account profile 116 and the secure account profile 132, or other account identifier.

The low side object storage service 104 located in the unsecure network 102 may be used to store files 112 as objects within object stores 114 (e.g., buckets or folders). For example, files may be stored within object stores 114 by assigning a file name (e.g., a unique file name) to a file that includes an identity of an object store 114 followed by the name of the file (e.g., object_store_name/filename). In one example configuration, a transfer folder 110 (e.g., an object store that has been designated as a transfer folder 110) may be created in the object storage service 104. The transfer folder 110 may then be associated with an unsecure account profile 116 so that users associated with the unsecure account profile 116 may access the transfer folder 110. Users may place files 112 that are to be transferred to the secure network 134 in the transfer folder 110 via a client device, from which the files 112 may be retrieved using a low side file transfer service 106 and provided to the one-way transfer device 118. The low side file transfer service 106 may be configured to monitor the transfer folder 110 for files 112 that have been placed in the transfer folder 110. When one or more files 112 are detected in the transfer folder 110, the file 112 may be moved to a staging location where the file 112 may be prepared for transfer to the secure network 134.

In another example configuration, a file transfer may be initiated using an API request. For example, by way of a user interface, a user associated with an unsecure account profile 116 may execute an Application Programming Interface (API) request that instructs the low side transfer service 106 to transfer a file 112 to the secure network 134. In executing the API request, the user may provide a file location by way of the user interface for the file to be transmitted. For example, the file location may be included as a parameter in the API request.

In another example configuration, a file transfer may be initiated using a message queue service in computing service environment (e.g., a distributed queue messaging service in a centralized cloud environment used to send messages via web service applications as a way to communicate with server computers over a network). For example, a message delivered using the message queue service may be received at the low side file transfer service 106. The receipt of the message may act as a request to transfer a file to the secure network 134. In one example, the message may include a file and information obtained from an unsecure account profile 116 (e.g., an account profile name 108) associated with the file. In another example, the message may specify a file location in the low side object storage service 104 where the file may be stored and information obtained from an unsecure account profile 116 associated with the file.

In yet another example configuration, an object storage service 104 may be configured to send a notification to a low side file transfer service 106 when a file 112 has been placed in a transfer folder 110, where the notification acts as a request to transfer the file 112 to a secure network 134. For example, a push notification may be sent from the object storage service 104 using a push notification service. Notifications received at a low side file transfer service 106 may be placed in a notification queue and the low side file transfer service 106 may retrieve the notifications from the queue and then retrieve a file from a respective transfer folder 110 in preparation for transfer.

Returning to the example illustrated, a file 112 copied from an object store 114 to the transfer folder 110 may be detected by the low side file transfer service 106 and the file 112 may be moved from the transfer folder 110 to a staging location, where the file 112 may be prepared for transfer to the secure network 134. In some examples, where the size of the file 112 may exceed a certain file size, the low side file transfer service 106 may be configured to prepare the file 112 for transfer by dividing the file 112 into a plurality of file parts and optionally compressing the file parts using a file compression technique.

An unsecure account profile 116 associated with the file 112 may be identified, and an account profile name 108 may be retrieved from the unsecure account profile 116. In one example, the account profile name 108 may be included in the name of the file 112. As such, when the file 112 is received at a secure network 134, the account profile name 108 may be retrieved from the file name. As an illustration, the account profile name 108 "account1234" may be appended to the file name "documentxyz", resulting in the file name "documentxyz_account1234". When the file 112 is received at a secure network, the account profile name 108 may be extracted from the file name for the file 112. In another example, the account profile name 108 may be included in a manifest file, or a separate file transmitted with a file 112 to a secure network 134. Other methods used to transmit an account profile name 108 with a file 112 to a secure network 134 are within the scope of this disclosure.

A manifest file may be created for the file 112. In one example, the manifest file may include the account profile name and an itemization of the file(s) 112 and/or of file parts that comprise the file 112 in instances where the file 112 has been divided into multiple file parts. Illustratively, the manifest file may be created within the staging location that contains the file 112, and a file naming convention may be used to link the manifest file to the file 112.

After the file 112 has been prepared for transfer to the secure network 134 and a manifest file has been created for the file 112, the low side file transfer service 106 may be configured to execute an API call that instructs the one-way transfer device 118 to download the file 112 and the manifest file to the one-way transfer device 118. Namely, in response to the API call, the one-way transfer device 118 may execute instructions that cause the file 112 and the manifest file to be transmitted from the staging location to computer memory included in the one-way transfer device 118.

In one example, a single one-way transfer device 118 may be assigned to the low side file transfer service 106. As a result, API calls requesting the transfer of files 112 to the secure network 134 may be routed to the specific one-way transfer device 118 assigned to the low side file transfer service 106. In another example, one-way transfer devices 118 may not be assigned to a low side file transfer service 106. Instead, a low side file transfer service 106 may be configured to identify a one-way transfer device 118 that may be available to transmit files 112 to the secure network 134 (e.g., via polling, voting, or load balancing) and then may send the one-way transfer device 118 an API request.

Having obtained the file 112 and the manifest file, the one-way transfer device 118 may be configured to transmit the file 112 and the manifest file to the secure network 134. As described earlier, the transmission of data from the unsecure network 102 to the secure network 134 is unidirectional. Therefore, no acknowledgement that a network packet was successfully transmitted to the secure network 134 may be given. Therefore, a user associated with the transfer of the file 112 may not have any assurances that the file 112 was successfully transmitted to the secure network 134. However, in one example, limited transfer diagnostics may be provided to a user on the unsecure network 102 that informs the user of the status of a file transfer. Illustratively, a user interface may display a transfer folder showing a graphical representation of files awaiting transfer, and an in-progress folder showing a graphical representation of the file during preparation of the file 112 for transfer to the secure network 134 and during transmission of the file 112 to the secure network 134. After transmission of the file 112 to the secure network 134 has completed, the user interface may be updated to show a completed folder containing a graphical representation of the file 112. A failed folder may show a graphical representation of files that failed to be transferred to the secure network 134.

Alternatively, a data store table may be used in providing transfer diagnostics to users of the unsecure network 102. The data store table may include fields associated with different states of a file transfer. The fields may be updated during the transfer process, and then transfer diagnostic applications or users may query the fields to obtain information about the state of a file transfer. For example, a data store table can include a transfer field, an in-progress field, a completed field and a failed field. Each of the fields may be updated to indicate the state of a file transfer.

In another example, after the file 112 has been transmitted to the secure network 134, a message may be sent to a user associated with the unsecure account profile 116 using a secure push messaging service. The message may indicate that the file 112 has been transferred to the secure network 134. Likewise, when the file 112 is received at the secure network 134, a message indicating that the file 112 has been transferred to the secure network 134 may be sent to a user associated a secure account profile 132 in the secure network 134 using the push messaging service.

The secure network 134 may include a high side file transfer service 122 that may be configured to receive a file 112 transmitted to the secure network 134 by a one-way transfer device 118. Upon receiving a file 112, the file 112 may be decompressed using the compression technique used to compress the file 112. Also, if the file 112 was divided into multiple file parts due to the size of the file 112, the file 112 may be reconstructed from the multiple file parts.

A secure account profile 132 associated with the file 112 may then be identified using the account profile name 108 included in the manifest file received with the file 112. For example, the account profile name 108 may be obtained from the manifest file when the file 112 is received and a secure account profile 132 having an account profile name 126 that matches the account profile name 108 included in the manifest file may be identified. The secure account profile 132 may then be used to identify an account folder 130 located on a high side object storage service 124 that may be associated with the secure account profile 132. The file 112 may then be moved to the account folder 130. Thereafter, a user associated with the secure account profile 132 may be notified that the file 112 has been placed in the user's account folder 130. In one example, the account folder 130 may be a root folder for an account associated with the secure account profile 132.

Figure 1B:
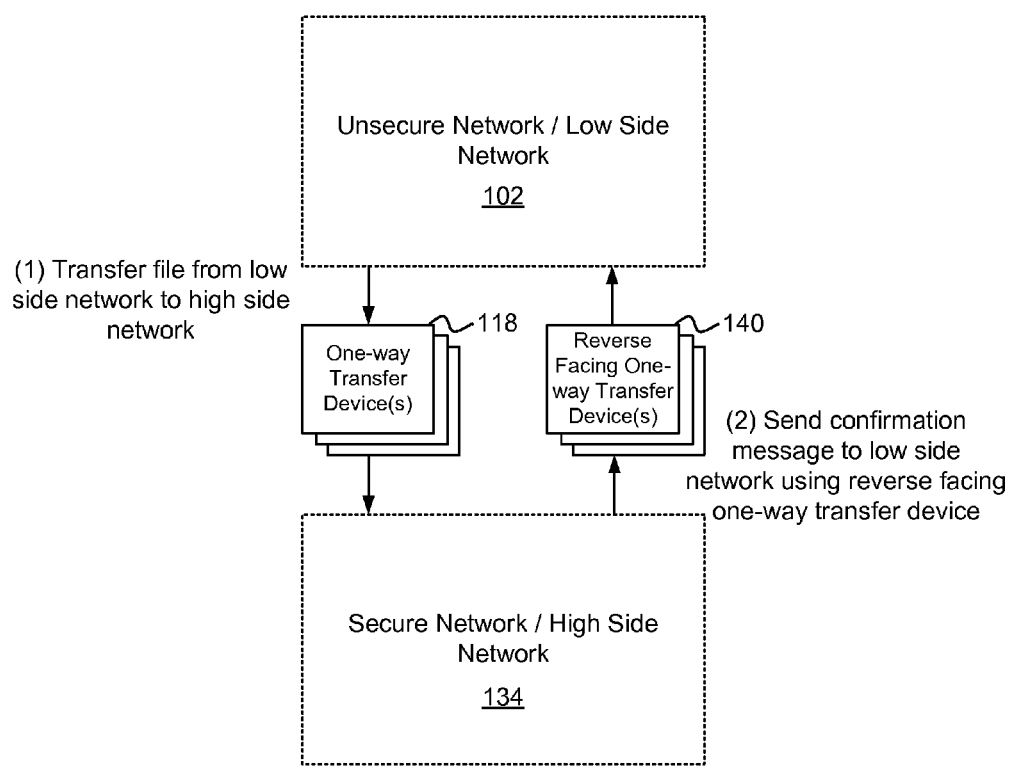
FIG. 1b is a block diagram illustrating the use of a reverse facing one-way transfer device to send a file transfer confirmation message.

In some example configurations, a file transfer system may include a reverse facing one-way transfer device 140 as illustrated in FIG. 1*b*. In such a system, a confirmation message that conforms to a pre-defined message format may be sent from a secure network 134 to an unsecure network 102 using the reverse facing one-way transfer device 140. The message may confirm that a file 112 was successfully transferred to the secure network 134. Illustratively, the confirmation message may include a success confirmation and a time stamp for when the file 112 was received. The message may then be provided to a user on the unsecure network 102 that initiated the transfer of the file 112. For example, a push message may be sent to the user by way of a push messaging service.

Although the examples illustrated above describe transferring files from an unsecure network to a secure network, it is understood that the system 100 can be configured to transfer files from a secure network to an unsecure network using a reverse facing one-way transfer device 140 as illustrated in FIG. 1*b*.

Figure 2:
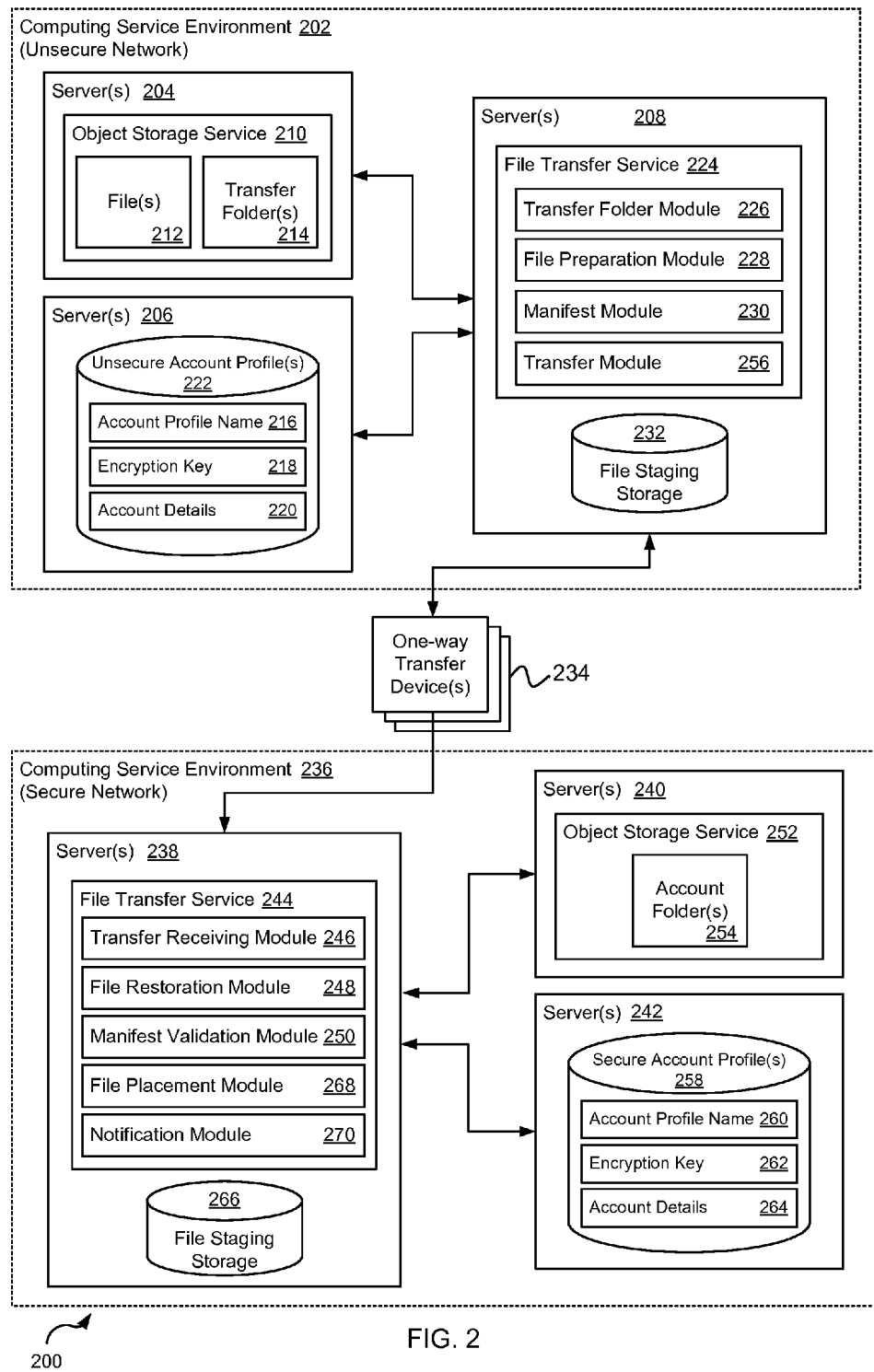
FIG. 2 is a block diagram that illustrates various example components included in a system for transferring files using a one-way device.

FIG. 2 illustrates components of an example system 200 on which the present technology may be executed. The system 200 may include a first computing service environment 202 that includes components of an unsecure network (e.g., low side network), and a second computing service environment 236 that includes components of a secure network (e.g., high side network). The computing service environments 202 and 236 may be one type of environment that includes various virtualized computing service resources that may be used, for instance, to host computing instances used to support an object storage service 210, 252 and a file transfer service 224, 244.

A computing service environment may be capable of delivering computing, storage and networking capacity as a software service to a community of end recipients. A computing service environment may offer a "private cloud environment." For example, a computing service environment may support a multi-tenant environment, wherein a plurality of customers may operate independently (i.e., a public cloud environment). Generally speaking, a computing service environment may provide the following models: Infrastructure as a Service ("IaaS"), Platform as a Service ("PaaS"), and/or Software as a Service ("SaaS"). Other models may be provided. For the IaaS model, a computing service environment may offer computers as physical or virtual machines and other resources. The virtual machines may be run as guests by a hypervisor. The PaaS model may deliver a computing platform that may include an operating system, programming language execution environment, database, and web server.

Services included in the computing service environment 202 (the unsecure network) may be hosted by a plurality of servers 204, 206 and 208 that host a low side object storage service 210, a data store service storing unsecure account profiles 222, and a low side file transfer service 224. The various services may be implemented using computing instances that execute the services. Likewise, services included in the computing service environment 236 (the secure network) may be hosted by servers 238, 240 and 242 that host a high side object storage service 252, a data store service storing secure account profiles 258, and a high side file transfer service 244, wherein computing instances may be used to execute the services.

As described earlier, a low side object storage service 210 may store files 212 as objects within object stores or buckets. As illustrated, the low side object storage service 210 may include a transfer folder 214. Copying a file 212 to the transfer folder 214 may subsequently result in the transfer of the file 212 from the unsecure network of the first computing service environment 202 to a secure network of the second computing service environment 236. For example, the transfer folder 214 may be monitored by the low side file transfer service 224 and when one or more files 212 are copied to the transfer folder 214, the files 212 may be transferred to the secure network. In addition to copying files 212 to the transfer folder 214, folders containing files 212 and subfolders containing files 212 may be copied to the transfer folder 214, and the folders and subfolders may then be transmitted to the secure network.

To illustrate, folders (e.g., buckets) may be created within an object storage service 210 using a file naming convention that assigns a file identifier (e.g., a unique file identification number or code) to files. For example, a file assigned the file identifier "first_folder/file1.txt" may result in creating a directory structure having a folder named "first_folder" that contains a file named "file1.txt". Additional files may be added to the folder by assigning the files an identifier (e.g., a unique file identification number or code) that includes the folder name. For example, a file identifier "first_folder/file2.txt" would add the file "file2.txt" to the folder "first_folder". Subfolders may be created using the same method above. Consequently, files and folders may be copied to a transfer folder 214 by prefixing a file identifier with a transfer folder 214 name (e.g., prefixing "transfer_folder" to the file identifier "first_folder/file1.txt", resulting in "transfer_folder/first_folder/file1.txt").

A transfer folder 214 may be established for individual unsecure account profiles 222 existing within the unsecure network. Namely, each unsecure account profile 222 may be assigned a transfer folder 214 used to transfer files 212 to a secure network. Security roles specifying access permissions may be established for a transfer folder 214, thereby associating the transfer folder with an individual unsecure account profile 222. For example, a security role may include user information for users included in the security role, transfer folder access permissions, and the like. Users belonging to an unsecure account profile 222 may access the transfer folder 214 associated with the unsecure account profile 222 according to the security role assigned, and may copy files 212 that are to be transferred to a secure network to the transfer folder 214.

In one example, files 212 copied to a transfer folder 214 may be encrypted using an encryption key 218. The encryption key 218 may be owned by an unsecure account profile 222 and a copy of the encryption key 262 may be included in a secure account profile 258 that corresponds with the unsecure account profile 222. For example, a file 212 may be encrypted using the encryption key 218 and transferred to the secure network, where the file may be decrypted using a copy of the encryption key 262 retrieved from the secure account profile 258. In cases where a transfer policy may specify that files 212 copied to a transfer folder 214 be encrypted, yet a one-way transfer device 234 may be configured to transmit unencrypted files, an encrypted file 212 may be decrypted prior to transmitting the file 212 to a secure network using an encryption key 218 obtained from an unsecure account profile 222. When received at a high side file transfer service 244, the file 212 may again be encrypted using an encryption key 262 obtained from a secure account profile 258.

In some examples, a number of files 212 transferred to a secure network during a particular period of time may be regulated. For example, the file transfer service 224 may be configured to check transfer folders 214 for files 212 according to a time interval that may be increased or decreased according to various network parameters. For instance, network bandwidth available to transmit files 212 from an unsecure network to a secure network may be limited to a number of one-way transfer devices 234 available to transmit the files 212. In the event that the network bandwidth of the one-way transfer devices 234 becomes overloaded, the time interval may be increased, thereby throttling the number of files 212 that are transferred to the secure network. Alternatively, a number of bytes transferred to a secure network may be regulated. For example, an unsecure account profile 222 may be limited to a particular number of bytes that can be transferred over a period of time (e.g., seconds, hours, day, etc.).

Figure 3:
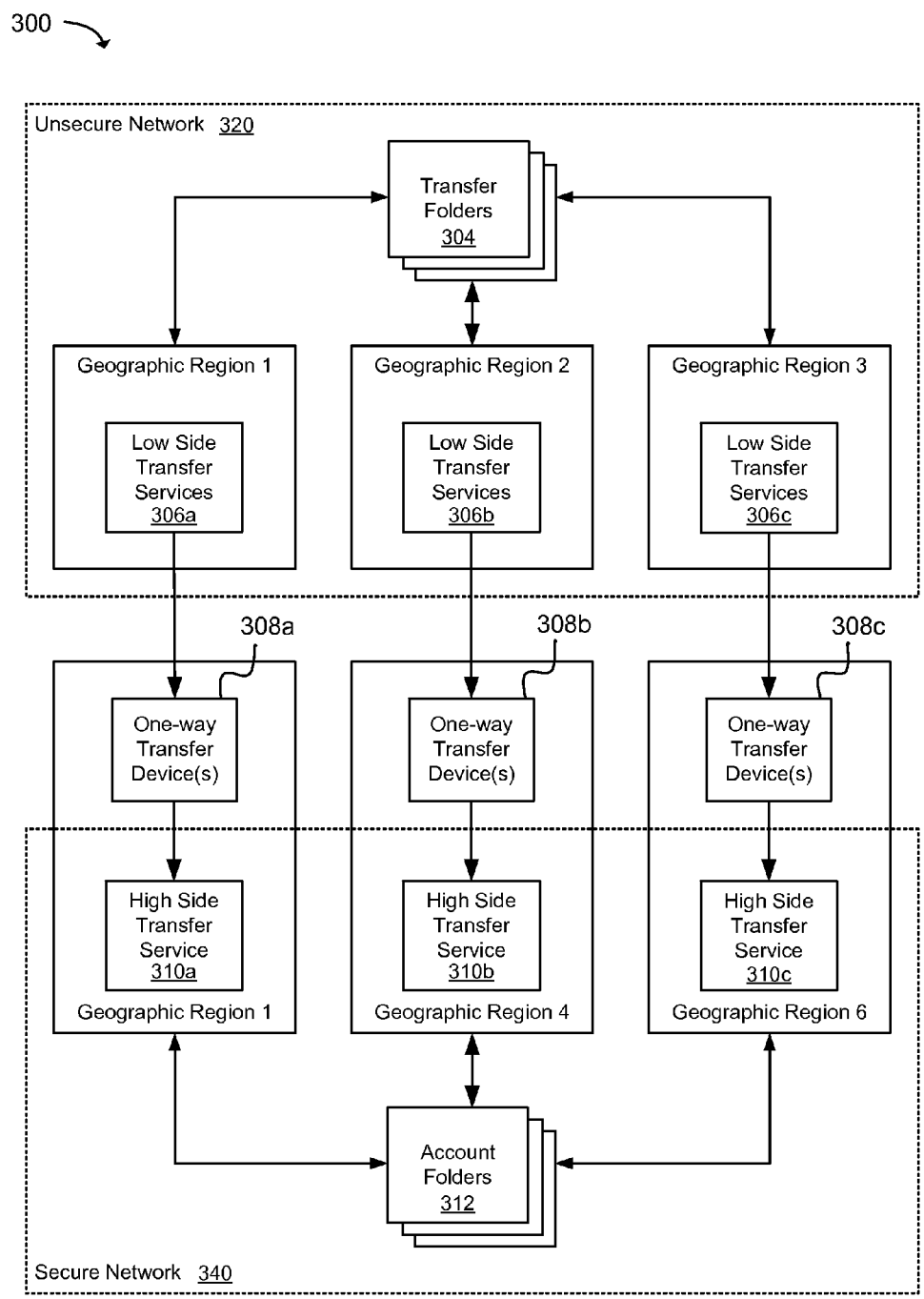
FIG. 3 is a block diagram that illustrates example system components geographically dispersed across multiple regions providing system fault tolerance.

A low side file transfer service 224 executing within the unsecure network may execute on a plurality of servers 208 located within a number of geographical regions as described in relation to FIG. 3. In one example configuration, the file transfer service 224 may include a transfer folder module 226, a file preparation module 228, a manifest module 230 and a transfer module 256. In one example, the transfer folder module 226 may be configured to monitor transfer folders 214 (e.g., periodically query or check the transfer folders 214) for the existence of files 212 that have been copied to the transfer folders 214. In the event that one or more files 212 are detected in a transfer folder 214, the files 212 may be moved (i.e., transmitted over a network) to a file staging storage 232. In another example, the transfer folder module 226 may be configured to monitor transfer folders 214 for files that contain a file reference (e.g., a file path) to a file 212 that is to be transferred to a secure network. The file reference may then be used to locate and copy the file 212 to the file staging storage 232. The transfer folder module 226 may be further configured to identify an unsecure account profile 222 associated with the file 212 and retrieve profile information (e.g., an account profile name 216 and account details 220) from the unsecure account profile 222, which may be used to prepare and transfer the file 212 to a secure network.

The file preparation module 228 may be configured to prepare a file 212 stored in the file staging storage 232 for transmittal to a secure network. Files 212 may be compressed using a file compression technique (e.g., a lossless file compression method such as Lempel-Ziv (LZ), Tar (tape archive) format, or the like) prior to transmitting the file to a secure network, and the files 212 may be decompressed when received at the secure network. In one example, large files 212 may be split into multiple file parts as a result of the file size of the file 212 exceeding a one-way transfer device 234 size specification. In cases where the file 212 may have been encrypted prior to storing the file 212 on the file staging storage 232, an encryption key 218 obtained from an unsecure account profile 222 associated with the file 212 may be used to decrypt the file 212 prior to compressing the file 212 and, if needed, dividing the file 212 into multiple file parts.

The manifest module 230 may be configured to generate a manifest file for a file 212 (or for a batch of files included in a batch file transfer). In one example, the manifest file may include an account profile name 216 associated with the file 212, and an itemization of the file 212 or files included in a file transfer. In cases where a file 212 has been divided into multiple file parts in preparation to transmit the file 212 to the secure network, the manifest file may itemize the files parts that are included in the file 212. Itemizations included in a manifest file, in one example, may be hash values generated using the file(s) 212 as input to a hash function. For example, the content of a file 212 may be hashed using a cryptographic hash function (e.g., MD5, SHA1, SHA2 or the like) and the resulting hash value may be included in the manifest file. Likewise, for files 212 that have been divided into multiple file parts, each file part may be hashed and the resulting hash value may be included in the manifest file.

Hash values included in a manifest file may be used at a high side file transfer service 244 to validate that a file 212 transferred to a secure network was transmitted without any errors. More specifically, upon arriving at the secure network, a second hash value may be generated using the file 212 (i.e., the file contents) received at the secure network and the hash function used to create the hash value (i.e., a first hash value) included in the manifest file. The second hash value may then be compared to the first hash value included in the manifest file, and if the hash values match, then the file 212 was transmitted without any errors or other problems (i.e., the file 212 transmitted from the unsecure network is identical to or linked to the file 212 received at the secure network).

In one example, the manifest module 230 may be further configured to generate a Keyed-hash Message Authentication Code (HMAC) using a manifest file as input to a hash function. The HMAC may then be appended to the manifest file prior to transmitting the manifest file to a secure network. When the manifest file is received at the secure network, the HMAC may be used to validate the contents of the manifest file (e.g., that the contents of the manifest file have not been altered or tampered with). A cryptographic key used to generate the HMAC may be shared between an unsecure network and a secure network, thereby enabling validation of the HMAC at the secure network.

After a file 212 has been prepared for transfer to a secure network and a manifest file has been generated for the file 212, the transfer module 256 may be configured to transfer the file 212 and the manifest file to one-way transfer device. In one example, the transfer module 256 may be configured to execute an API call made to a one-way transfer device 234 requesting that the file 212 and the manifest file be transmitted to a secure network. For example, a Representational State Transfer (RESTful) API call may be executed that may be received by the one-way transfer device 234, whereupon the one-way transfer device 234 may be configured to establish a Secure File Transfer Protocol (SFTP) or a Secure Copy Protocol (SCP) connection between the server 208 containing the file 212 and the manifest file in the file staging storage 232 and the one-way transfer device 234. In one example, the file 212 (or the file parts if the file 212 has been divided) and the manifest file may then be transferred to computer memory contained on the one-way transfer device 234. In another example, rather than transferring the file 212 and the manifest file to computer memory included in the one-way transfer device 234, the one-way transfer device 234 may be configured to transmit the file 212 and the manifest file directly from the file staging storage 232 to a secure network.

In one example configuration, a server 208 that may be configured to initiate a transfer of a file 212 from an unsecure network that includes the server 208 to a secure network, may be assigned a particular a one-way transfer device 234, thereby establishing a one-to-one correspondence between a server 208 and a one-way transfer device 234. In another example, a pool of one-way transfer devices 234 may be accessible to servers 208 to transmit files 212 from an unsecure network to a secure network. As file transfer demand fluctuates, one-way transfer devices 234 may be added or removed from the pool of one-way transfer devices 234.

A file 212 received at a secure network after having been transmitted by a one-way transfer device 234 may be provided to a server 238 that hosts a high side file transfer service 244 and stored in file staging storage 266. The high side file transfer service 244 may include a transfer receiving module 246, a file restoration module 248, a manifest validation module 250, a file placement module 268, and a notification module 270. The transfer receiving module 246 may be configured to receive a file 212 and a manifest file transmitted to the secure network and identify a secure account profile 258 associated with the file 212. In one example, upon receiving a file 212 and a manifest file, the transfer receiving module 246 may be configured to provide the manifest file to the manifest validation module 250, which may be used to validate the manifest module via an HMAC included in the manifest file and validate the successful transmission of the file(s) 212 to the secure network by verifying an itemization listing in the manifest file as described earlier.

After verifying that a file 212 was successfully transmitted to the secure network, the file 212 may be provided to the file restoration module 248, which may be configured to restore the file 212 to a pre-transfer state. For example, the file 212 may be decompressed using a file compression technique that was used to compress the file prior to being transferred to the secure network. Also, if the file 212 was divided into multiple file parts prior to being transferred to the secure network, the file 212 may be reconstructed using the file parts.

Having validated the file 212 and restored the file 212 to a pre-transfer state, an account profile name 216 may be obtained from the manifest file associated with the file 212 (i.e., the manifest file that was transmitted to the secure network with the file 212). The account profile name 216 may be used to identify a secure account profile 258 having an account profile name 260 that matches the account profile name 216 included in the manifest file. Once a secure account profile 258 has been identified for the file 212, the secure account profile 258 may be referenced to obtain account details 264 that identify an account folder 254 (e.g., a root folder) in a high side object storage service 252 that may be associated with the secure account profile 258. A file placement module 268 may be configured to move the file 212 from the file staging storage 266 to the account folder 254. In addition, folders and any subfolders that may have been included in a batch transfer of files 212 may be moved from the file staging storage 266 to the account folder 254.

The various processes and/or other functionality contained within the system 200 may be executed on one or more processors that are in communication with one or more memory modules included in a server. The system 200 may include a number of servers that are arranged, for example, in one or more server banks or computer banks or other arrangements. The servers may support a computing service environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The servers and one-way transfer devices illustrated in FIG. 2 may be in communication by way of a network that may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

FIG. 3 is a block diagram illustrating an example system 300 that may include system components that are geographically dispersed across multiple regions, thereby providing fault tolerance for the system 300. The system 300 may include server computers (e.g., physical hosts) that are located within different geographical regions that may be used to transfer files from an unsecure network 320 to server computers (e.g., physical hosts) included in a secure network 340 using one-way transfer devices 308a-c. As illustrated, transfer folders 304 associated with unsecure account profiles may be monitored by low side transfer services 306a-c that may be hosted on server computers located within different geographic regions The low side transfer services 306a-c may be configured to monitor the different transfer folders 304 for the presence of files that have been copied to the transfer folders 304 by a user associated with an unsecure account profile.

Files copied to a transfer folder 304 may be transmitted to a high side transfer service 310a-c located in a secure network 340 via a one-way transfer device 308a-c. After receiving a file at a high side transfer service 310a-c, the file may be moved to an account folder 312 associated with a secure account as described earlier.

In one example, low side transfer services 306a-c may be configured to monitor transfer folders 304, such that a many-to-many relationship is established and multiple low side transfer services monitor multiple transfer folders. In the event that a low side transfer service 306a determines that a transfer folder 304 contains a file, the other low side transfer services 306b-c are put on notice that the low side transfer service 306a is handling the transfer of the file.

In the event that part of the system 300 should fail (e.g., a server computer located in a particular geographic region goes down), other portions of the system 300 that are functioning may pick up a workload for that part of the system 300 that failed. As an illustration, should a first server computer located in a first geographic region fail, where the first server computer executes a low side transfer service 306a-c that monitors transfer folders 304 for files, a second server computer located in a second geographic region may assume the first server computer's workload by monitoring the transfer folders 304 for files.

Figure 4:
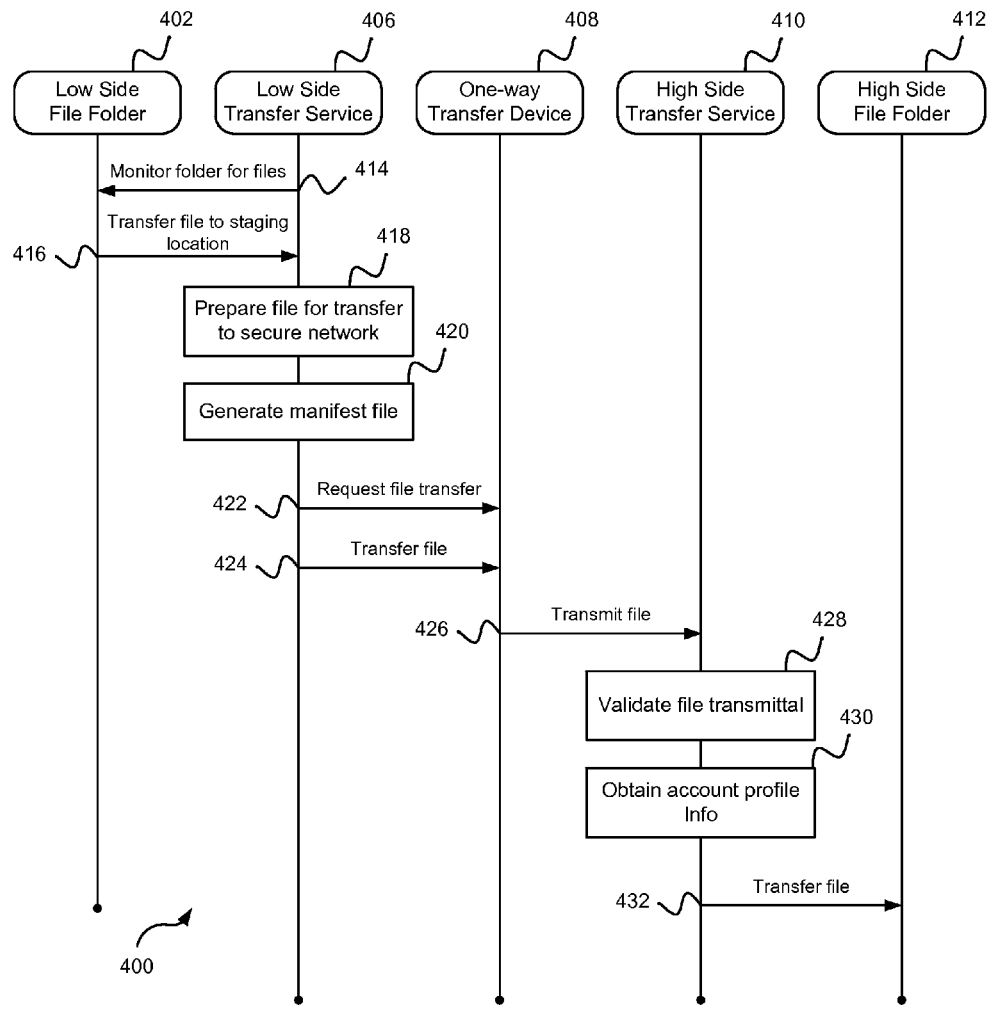
FIG. 4 is a system flow diagram illustrating an example method for transferring files from a low side network to a high side network using a one-way transfer device.

Moving now to FIG. 4, a system flow diagram illustrates an example method 400 for transferring files from a low side network (e.g., an unsecure network) to a high side network (e.g., secure network) using a one-way transfer device. As illustrated, a low side transfer service 406 may be configured to monitor 414 a low side file folder 402 for files that may have been copied to the low side file folder 402. The low side file folder 402 may be a directory in a hierarchical file system in which users associated with a low side (unsecure) account profile may place files that the users want to be transferred to a high side file folder 412. The low side transfer service 406 may be configured to periodically query the low side file folder 402 to determine whether the low side file folder 402 contains one or more files.

Alternatively, a database table having a file transfer flag field and a file location field may be used to initiate a transfer of one or more files. The low side transfer service 406 may periodically query the table to determine whether the file transfer flag has been set and retrieve one or more files from a storage location specified in the file location field as a result of the file transfer flag being set.

In the case that the low side file folder 402 contains a file, the file may be transferred to a staging location 416, where as in block 418, the file may be prepared for transmittal to the high side network. A low side account profile may be identified for the file, for example, by identifying a low side account profile associated with the low side file folder 402 and associating the low side account profile with the file. In one example, the file may be prepared for transmittal to the high side network by compressing the file using a data compression technique. In another example, large files that may be larger than an acceptable file size as specified by a one-way transfer device 408 may be split into a plurality of smaller file parts.

As in block 420, a manifest file may be generated for files that are to be transmitted to the high side network. The manifest file may contain an itemization of files and/or file parts that are to be transmitted to the high side network, as well as an account profile name that may be obtained from the low side account profile associated with the file. As described earlier, hash values generated by hashing the content of a file or file part may be included in the manifest file and may be used to validate that the file or the file part were received at the high side network without error. In addition, an HMAC may be generated using the manifest file and the HMAC may be appended to the manifest file and used to validate the contents of the manifest file when received at the high side network.

Having prepared the file for transmittal to the high side network, the low side transfer service 406 may be configured to send a request 422 to a one-way transfer device 408 requesting that the one-way transfer device 408 transmit the file and the manifest file to the high side network. In one example, in response to the request 422, the one-way transfer device 408 may be configured to transfer the file 424 and the manifest file from the staging location to memory of the one-way transfer device 408, whereupon the one-way transfer device 408 may cause the file and the manifest file to be transmitted 426 to the high side network where the file and the manifest file may be received at a high side transfer service 410. In another example, in response to the request 422, the one-way transfer device 408 may be configured to transmit 426 the file and the manifest file directly from the staging location to the high side network.

Upon receiving the file and the manifest file at the high side transfer service 410, as in block 428, transmission of the file from the low side network to the high side network may be validated. For example, the manifest file may be validated using the HMAC, and the itemization of files in the manifest file may be compared with the file(s) and/or file parts received at the high side network (e.g., using the hash values included in the manifest file).

As in block 430, high side account profile information may be obtained for the file using the account profile name included in the manifest file. The high side account profile information may specify a high side file folder 412 for the high side account. The file may then be transferred 432 to the high side file folder 412 for the high side account, thereby making the file accessible to users of the high side account.

Figure 5:
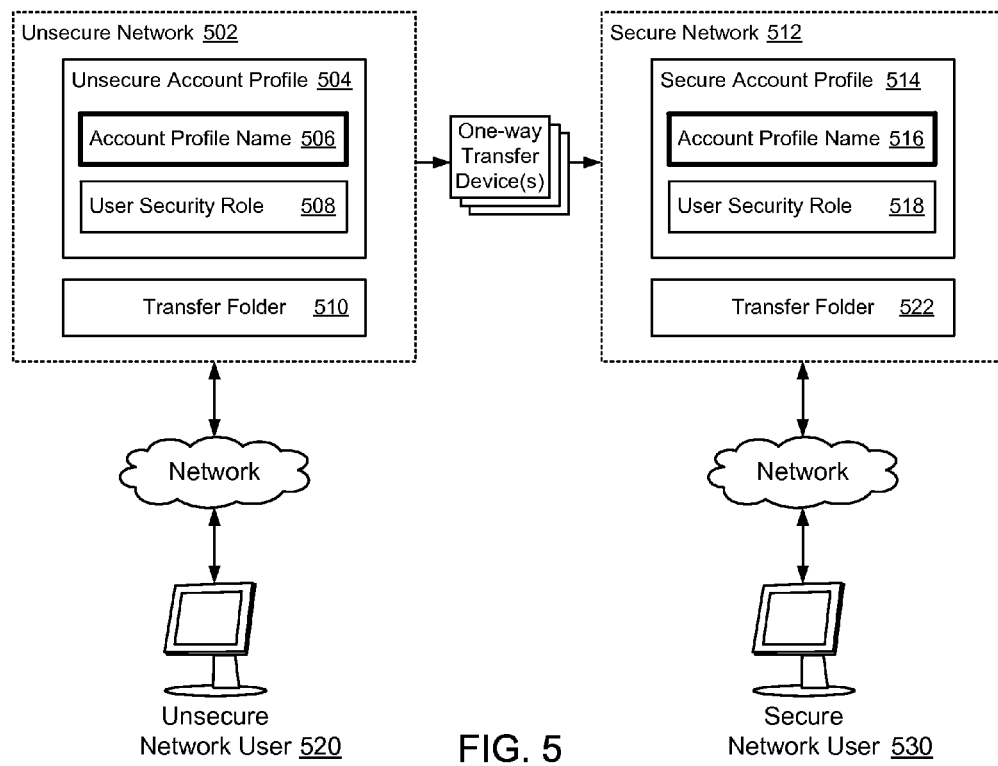
FIG. 5 is a diagram that illustrates an example account profile configuration that may be used to link an unsecure account profile located on an unsecure network with a secure account profile located on a secure network.

FIG. 5 is a diagram illustrating an account profile configuration that may be used to link an unsecure account profile 504 located on an unsecure network 502 with a secure account profile 514 located on a secure network 512. In one example configuration, an electronic interface (e.g., a web site portal) may be provided to unsecure network users 520 having access to the unsecure network 502, thereby allowing the unsecure network users 520 to set up an unsecure account profile 504 located in the unsecure network 502. Likewise, an electronic interface may be provided to secure network users 530 having access to the secure network 512 to set up a secure account profile 514 located in the secure network 512. A user may not have access to both the unsecure network 502 and the secure network 512 at the same time.

Illustratively, an unsecure network user 520 may set up an unsecure account profile 504 by providing user information and an account profile name 506 that may be used to link the unsecure account profile 504 with a secure account profile 514. A user security role 508 may be assigned to the unsecure account profile 504, for example, by a network administrator. Also, a transfer folder 510 located in the unsecure network 502 may be created for the unsecure account profile 504 and the user security role 508 may be assigned to the transfer folder 510, thereby associating the transfer folder 510 with the unsecure account profile 504 and providing access to the transfer folder 510 to the unsecure network user 520.

Similarly, a secure network user 530 may set up a secure account profile 514 that corresponds with the unsecure account profile 504 by providing an account profile name 516 that may be identical to or linked to (e.g., associated using a set and subset relationship where the secure account name is a subset of the unsecure account name or vice versa) the account profile name 506, thereby linking the unsecure account profile 504 to the secure account profile 514. A secure network user 530 may provide user information and a user security role 518 may be assigned to the secure account profile 514. A transfer folder 522 located in the secure network 512 may be created for the secure account profile 514 and the user security role 518 may be assigned to the transfer folder 522 providing access to the transfer folder 522 to the secure network user 530.

In one example, after an account profile (e.g., an unsecure account profile 504 and a secure account profile 514) has been set up by a user, the account profile may be approved by an account administrator. User groups (e.g., POSIX groups) may be created that include an account profile and allow access to a transfer folder by members of a user group. Also, account tracking may be enabled that tracks the actions of users belonging to a profile account. The account profile configuration described above results in isolating account profile information to the network where the account profile resides. More specifically, information included in an unsecure account profile 504 and information included in a corresponding secure account profile 514 may not be shared between the unsecure network 502 and the secure network 512.

Figure 6:
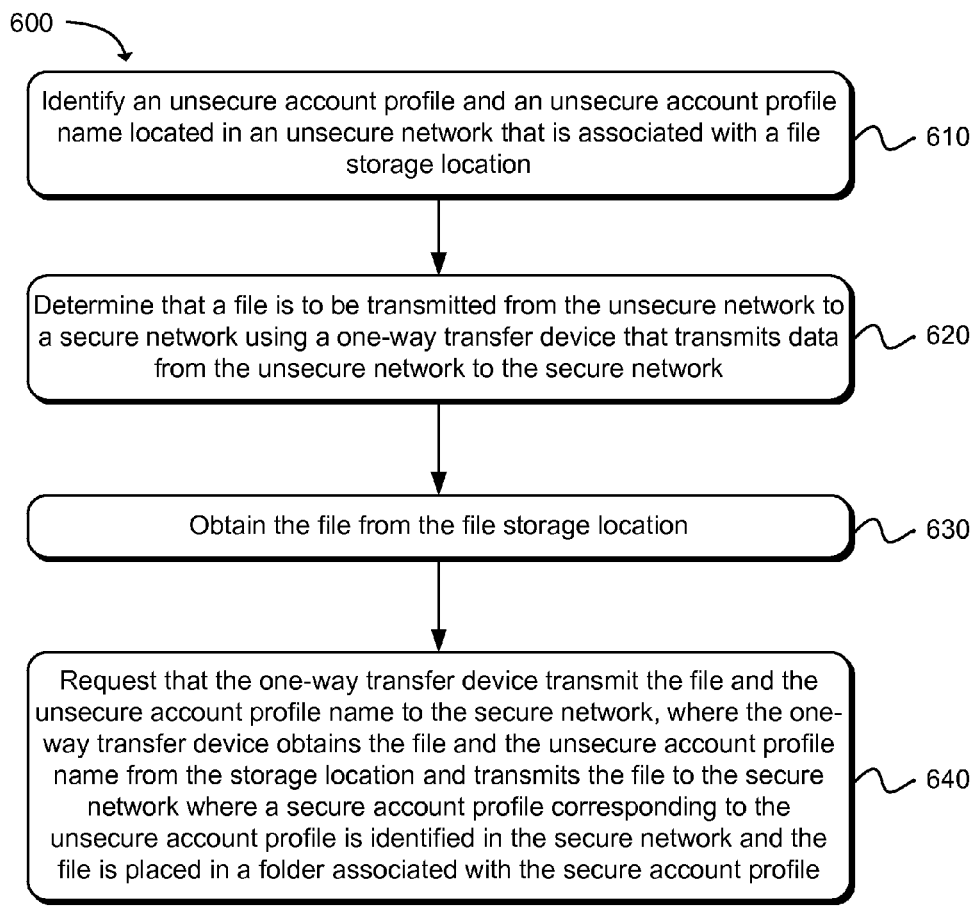
FIG. 6 is a block diagram illustrating an example method for transferring a file from an unsecure network to a secure network using a one-way transfer device.

FIG. 6 is a flow diagram that illustrates an example method 600 for transferring a file from an unsecure network to a secure network using a one-way transfer device. Beginning in block 610, an unsecure account profile and unsecure account profile name may be identified that may be located in an unsecure network that is associated with a file storage location. As in block 620, a determination may be made that a file located in the file storage location is to be transmitted from the unsecure network to a secure network using a one-way transfer device that transmits data from the unsecure network to the secure network. For example, a storage location may be established for unsecure network users associated with an unsecure account profile. Unsecure network users may copy files to the storage location (via a client device) to initiate the method 600 that transfers the files to the secure network.

As in block 630, the file may be obtained from the file storage location. As in block 640, a request may be sent to the one-way transfer device that the one-way transfer device transmit the file and the unsecure account profile name to the secure network. The one-way transfer device may then obtain the file and the unsecure account profile name from the storage location and transmit the file to the secure network. When received at the secure network, a secure account profile corresponding to the unsecure account profile may be identified in the secure network and the file may be placed in a folder associated with the secure account profile.

Figure 7:
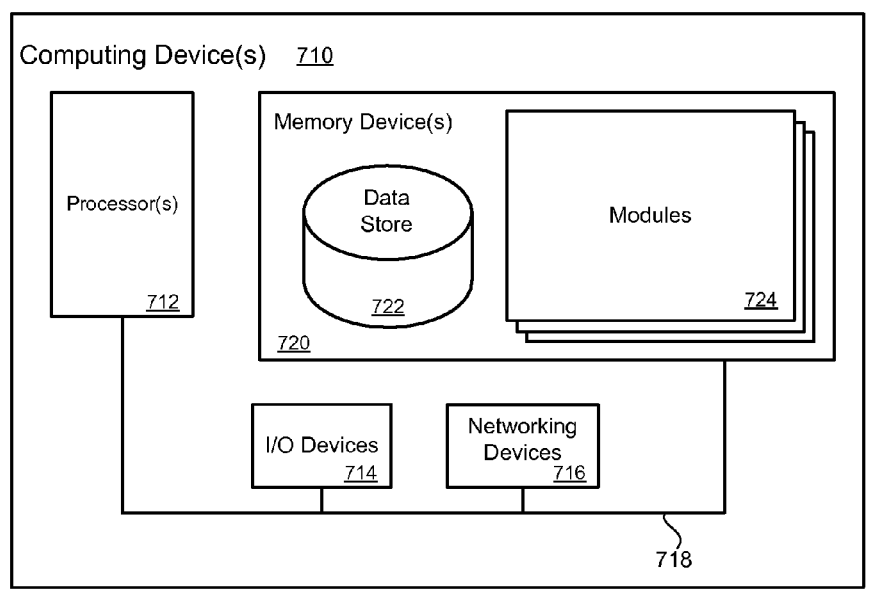
FIG. 7 is block diagram illustrating an example of a computing device that may be used to execute a method for transferring files from an unsecure network to a secure network.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 724 that are executable by the processor(s) 712 and data for the modules 724. In one example, the memory device 720 may contain a transfer folder module, file preparation module, manifest module, transfer module, transfer receiving module, file restoration module, manifest validation module, as well as other modules. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
   identify an unsecure account profile and an unsecure account profile name located in an unsecure network that is associated with a transfer folder located in a first object storage service;
   determine that the transfer folder contains a file that is to be transmitted to a secure network using a one-way transfer device that transmits data from the unsecure network to the secure network;
   obtain the file from the transfer folder and place the file in a staging storage location;
   generate a manifest file that includes a file hash value used to validate contents of the file;
   generate a manifest hash value using a hash-based message authentication code ("HMAC") that is used to validate contents of the manifest file;
   append the manifest hash value to the manifest file; and
   request that the one-way transfer device transmit the file, the unsecure account profile name, and the manifest file to the secure network, wherein the one-way transfer device obtains the file, the unsecure account profile name, and the manifest file from the staging storage location and transmits the file, the unsecure account profile name, and the manifest file to the secure network, where a secure account profile corresponding to the unsecure account profile is identified in the secure network using the unsecure account profile name and the file is placed in a folder in a second object storage service associated with the secure account profile.

2. A non-transitory machine readable storage medium as in claim 1, wherein instructions that when executed by the processor prepare the file for transmission to the secure network by compressing the file using a data compression technique and dividing the file into a plurality of file parts.

3. A computer implemented method, comprising:
   identifying an unsecure account profile located in an unsecure network that is associated with a file storage location, using the processor;
   determining that a file is to be transmitted from the unsecure network to a secure network using a one-way transfer device that transmits data from the unsecure network to the secure network, using a processor;
   obtaining the file from the file storage location, using the processor;
   identifying an unsecure account profile name for the unsecure account profile, using the processor;
   generating a manifest file that includes a file hash value used to validate contents of the file;
   generating a manifest hash value using a hash-based message authentication code ("HMAC") that is used to validate contents of the manifest file;
   appending the manifest hash value to the manifest file;
   requesting that the one-way transfer device transmit the file, the manifest file, and the unsecure account profile name to the secure network, using the processor, wherein the one-way transfer device obtains the file, the manifest file, and the unsecure account profile name from the storage location; and
   transmitting the file and the manifest file to the secure network where a secure account profile corresponding to the unsecure account profile is identified using the unsecure account profile name; and
   the file and the manifest file are placed in a folder associated with the secure account profile.

4. A method as in claim 3, further comprising encrypting the file using an encryption key specified in the unsecure account profile and placing the file in the file storage location, wherein the file is decrypted prior to the one-way transfer device transmitting the file to the secure network.

5. A method as in claim 3, further comprising:
   associating the unsecure account profile with a first user having access to the unsecure network, wherein the unsecure account profile includes the unsecure account profile name; and
   associating the secure account profile with a second user having access to the secure network, wherein the secure account profile includes a secure account profile name that is linked to the unsecure account profile name.

6. A method as in claim 3, wherein determining that the file is to be transmitted further comprises, determining that a transfer folder contains a file folder and at least one file subfolder to be transmitted from the unsecure network to the secure network.

7. A method as in claim 6, further comprising providing a diagnostic state of a file transfer via a graphical user interface by:
   displaying the file in a transfer folder while the file is awaiting transfer to the secure network;
   displaying the file in an in-progress folder while the file is being prepared for transfer to the secure network and during transmission of the file to the secure network; and
   displaying the file in a completed folder after the file has been transmitted to the secure network, or displaying the file in a failed folder as a result of a transfer of the file to the secure network failing.

8. A method as in claim 3, wherein determining that the file is to be transmitted further comprises, receiving an Application Programming Interface (API) request at a low side file transfer service to transfer the file to the secure network, the API request identifying a location of the file on the unsecure network.

9. A method as in claim 3, wherein determining that the file is to be transmitted further comprises, receiving a message at a low side file transfer service via a message queue service that includes the file and the profile name for the profile located in the unsecure network, wherein receipt of the message is a request to transfer the file to the secure network.

10. A method as in claim 3, further comprising:
sending a message to a first user associated with the unsecure account profile located in the unsecure network that the file has been transferred using a push messaging service; and
sending a message to a second user associated with the secure account profile located in the secure network that the file has been transferred using the push messaging service.

11. A method as in claim 3, wherein requesting that the one-way transfer device transmit the file to the secure network further comprises:
executing a Representational State Transfer (RESTful) API call that is received by the one-way device; and
transmitting the file to the one-way device using a Secure File Transfer Protocol (SFTP) or Secure Copy Protocol (SCP) connection established by the one-way device.

12. A method as in claim 3, wherein requesting that the one-way transfer device transmit the file to the secure network further comprises, identifying the one-way transfer device as being assigned to a server computer configured to initiate a transfer of the file from the unsecure network to the secure network.

13. A method as in claim 3, further comprising regulating a number of files associated with the unsecure account profile that are transferred from the unsecured network to the secured network during a period of time.

14. A method as in claim 3, further comprising assigning a security role to the unsecure account profile where the security role is used to control access to the file storage location.

15. A method as in claim 3, further comprising transmitting a confirmation message conforming to a pre-defined message format from the secure network to the unsecure network using a reverse facing one-way transfer device, the confirmation message confirming successful transfer of the file to the secure network.

16. A system comprising:
a processor;
a memory device including instructions that, when executed by the processor, cause the system to:
monitor a transfer folder for a file that is to be transmitted to a secure network using a one-way transfer device configured to transmit data from an unsecure network to the secure network;
identify an unsecure account profile that is associated with the file located in the unsecure network;
obtain an unsecure account profile name from the profile;
generate a manifest file that includes a file hash value used to validate contents of the file;
generate a manifest hash value using a hash-based message authentication code ("HMAC") that is used to validate contents of the manifest file;
append the manifest hash value to the manifest file;
request that the one-way transfer device transmit the file, the manifest file, and the unsecure account profile name to the secure network, wherein the one-way transfer device obtains the file, the manifest file, and the unsecure account profile name from the transfer folder;
transmit the file, the manifest file, and the unsecure account profile name to the secure network, where the unsecure account profile name is used to identify a secure account profile located in the secure network; and
place the file and the manifest file in a transfer folder associated with the secure account profile.

17. A system as in claim 16, wherein the memory device includes instructions that, when executed by the processor, causes the system to determine a number of one-way transfer devices and transfer services used to transmit files from the unsecured network to the secured network that are scaled according to a number of file transfer requests.

18. A system as in claim 16, wherein the memory device includes instructions that, when executed by the processor, causes the system to monitor transfer folders using a plurality of server computers located across a plurality of separate geographical regions, the plurality of server computers providing fault tolerance for the system.

19. A system as in claim 16, wherein the memory device includes instructions that, when executed by the processor, causes the system to provide an electronic interface that enables a first user to set up the unsecure account profile located in the unsecure network or a second user to set up the secure account profile located in the secure network.

20. A system as in claim 16, wherein the memory device includes instructions that, when executed by the processor, causes the system to provide an electronic interface showing a status of a transfer of the file from the unsecure network to the secure network.

* * * * *